United States Patent
Cook et al.

(10) Patent No.: US 6,591,484 B2
(45) Date of Patent: Jul. 15, 2003

(54) INTERNAL COMBUSTION ENGINE PISTON INSERTION MACHINE

(75) Inventors: James A. Cook, Delphi, IN (US); Brad A. Moore, Frankfort, IN (US); Kevin R. Shaffer, Monticello, IN (US); James L. Thien, Logansport, IN (US); Robert L. Walters, Lafayette, IN (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 09/881,349

(22) Filed: Jun. 14, 2001

(65) Prior Publication Data

US 2002/0189081 A1 Dec. 19, 2002

(51) Int. Cl.[7] ................................................ B23P 19/00
(52) U.S. Cl. ............................ 29/709; 29/407.1; 29/269
(58) Field of Search ....................... 29/888.01, 888.011, 29/888.04, 888.041, 888.044, 888.06, 407.09, 407.1, 468, 559, 702, 709, 712, 714, 824, 281.1, 281.5, 222, 224, 269

(56) References Cited

U.S. PATENT DOCUMENTS

| | | | | |
|---|---|---|---|---|
| 2,697,870 A | * | 12/1954 | Zucker | 29/269 |
| 3,754,312 A | * | 8/1973 | Komorek | 29/269 |
| 3,813,755 A | * | 6/1974 | Maskell et al. | 29/269 |
| 3,952,393 A | * | 4/1976 | Van Ravenzwaay et al. | 29/888.044 |
| 4,887,341 A | * | 12/1989 | Sakimori et al. | 29/464 |
| 5,537,734 A | * | 7/1996 | Belka et al. | 29/705 |
| 5,539,981 A | * | 7/1996 | Burcham et al. | 29/888.061 |
| 6,047,472 A | * | 4/2000 | Koch et al. | 29/888.01 |
| 6,516,511 B1 | * | 2/2003 | Cook et al. | 29/269 |

FOREIGN PATENT DOCUMENTS

| | | | | |
|---|---|---|---|---|
| JP | 401281832 A | * | 11/1989 | 29/888.044 |

* cited by examiner

Primary Examiner—Gregory Vidovich
Assistant Examiner—Jermie E. Cozart
(74) Attorney, Agent, or Firm—A Calderon; Jason J Stanley

(57) ABSTRACT

A piston insertion machine for inserting piston assemblies into respective cylinders of an internal combustion engine. The piston insertion machine eliminates the need for individually lifting and inserting the piston assemblies into the respective cylinders. The piston insertion machine includes a barrel assembly for holding the piston assembly. A first set of components pivot the piston barrel assembly (and thus the piston assembly) from an upright position to a horizontal position. Another component inserts the piston assembly into the cylinder of the engine block.

11 Claims, 4 Drawing Sheets

INTERNAL COMBUSTION ENGINE PISTON INSERTION MACHINE

TECHNICAL FIELD

This invention relates generally to a piston insertion machine and more particularly to a machine for inserting piston assemblies into respective cylinders of an internal combustion engine.

BACKGROUND ART

Internal combustion engines include a vast array of components that need to be assembled in a very precise manner. The proper assembly of the components is of the utmost importance since it ensures that the engine will work within its intended design parameters, i.e., in the most efficient manner.

The assembly of these components is both time consuming and arduous, even for the most experienced technician. This is mainly due to the fact that the technician manually performs many of the assembly steps, even those steps which require lifting heavy and awkward components such as piston assemblies. These steps are performed manually despite the fact that they lead to higher manufacturing and production costs.

By way of example, the internal combustion engine may include components such as cylinder liners, piston assemblies, crankshafts, camshafts, valves and the like. In order to correctly assemble all of these components, the technician typically performs several assembly steps on both the engine block as well as many of the engine components. These steps may include lining the cylinders with cylinder liners, and assembling a piston assembly. The piston assembly includes connecting the connecting rod to the piston with a pin and placing rings within grooves of the piston crown. Once the rings are placed within the grooves, the technician thereafter places the piston and rings within a piston ring compressor. The piston ring compressor compresses the piston rings within the grooves of the piston crown so that the piston assembly can be properly inserted within the cylinder.

Once the piston is properly inserted within the piston ring compressor, the technician manually lifts the piston assembly and aligns the piston with the cylinder. After the technician aligns the piston with the cylinder, the piston assembly (connecting rod first) is manually inserted into the cylinder and the connecting rod is connected to the crankshaft.

However, a single technician cannot insert the piston assembly entirely into the cylinder. Accordingly, a second technician is positioned on a rear side of the internal combustion engine and continues the insertion process. This not only ensures that the piston assembly is completely inserted within the cylinder, but equally ensures that the connecting rod of the piston is properly aligned with and connected to the crankshaft. These same steps must be performed upwards of eight or more times for each engine block, depending on the number of cylinders within the engine block.

As is known, however, some internal combustion engines are very large such as internal combustion engines which power, for example, power generation sets, earth working machinery, paving machinery, load transfer carrying machinery and the like. Due to the size of these internal combustion engines, the piston assemblies as well as other components of such engines must likewise be larger in size. This results in a piston assembly which may weigh upwards of twenty five (25) kilograms (approximately 55 pounds) or more.

When the piston assembly is of such a size and weight it may be difficult for the technician to manually lift the piston assembly. This is especially true when the piston ring compressor assembly is placed about the crown of the piston, which adds further weight to the entire assembly. Due to the added weight of the piston assembly, it may also be difficult for the technician to align and insert the piston assembly into the cylinder. These problems are only increased by the fact that the above assembly steps must be performed countless times during a single workday.

In order to solve these problems, current methods of assembling an internal combustion engine include using more than one technician to lift the piston assembly and perform the aligning and inserting steps. Alternatively, it is known that several technicians may take turns lifting the piston assembly and performing the aligning and inserting steps. In either case, these solutions are not very efficient, and typically lead to higher manufacturing and production costs. Of course, these higher manufacturing and production costs are then passed along to the consumer by raising the cost of the machine which utilizes such engine.

The present invention is directed to overcoming one or more of the problems as set forth above.

DISCLOSURE OF THE INVENTION

In one aspect of the present invention, a piston insertion machine for inserting a piston assembly into a cylinder of an engine block is provided. The piston insertion machine includes a barrel assembly and a positioning mechanism attached to the barrel assembly. An inserting mechanism communicates with the barrel assembly.

In another aspect of the present invention, a first component is provided to move the barrel assembly between a first position and a second position. A second component is provided for moving the barrel assembly into an extended position, and a third component is provided for moving the piston assembly into the cylinder.

BRIEF DESCRIPTION OF THE DRAWINGS

In FIG. 3, the component 62 is in a retracted position, and the component 64 and the component 66 are in a horizontal position. The positioning arm 60 is located proximate to the cylinder 76. Also, the component 66 is seen connected to the base 50b on the second side 72 of the barrel frame 50a.

BEST MODE FOR CARRYING OUT THE INVENTION

Figure 1:
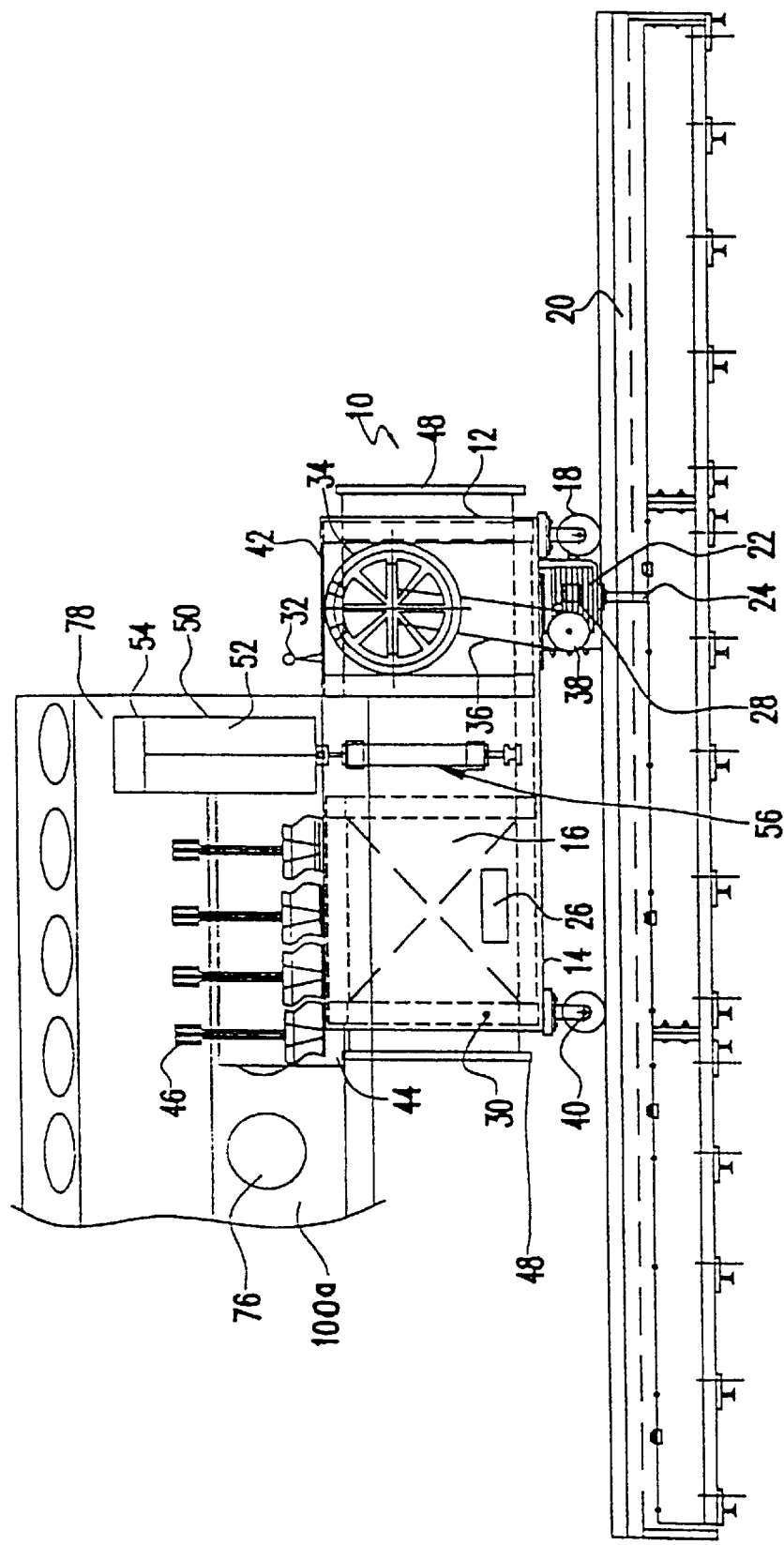
Referring to FIG. 1, a diagrammatic front plan view of the piston insertion machine of the present invention is shown. In this view, the piston insertion machine 10 is in a first or upright position.

Referring to FIG. 1, a diagrammatic front plan view of the piston insertion machine of the present invention is shown. In this view, the piston insertion machine 10 is in a upright or upright position.

The piston insertion machine 10 includes a frame 12 (e.g., cart) having a bottom surface 14 and an inner compartment 16. Wheels 18 extend from the bottom surface 14 of the frame 12, and ride along tracks 20 that are aligned with and parallel to a front facing surface 100a of an engine block 78. It should be understood by those of ordinary skill in the art that the wheels 18 do not have to ride along the tracks 20 but may simply ride along the floor.

A motor 22 is located on the frame 12 and connects to a rack and pinion gear 24, where the rack is preferably located along the track 20. The motor 22 may also be directly connected to the wheels 18 via the gear 24. The gear 24 may be set to any gear ratio, depending on the particular design of the piston insertion machine 10. A controller 26 and an encoder 28 are also provided on the frame 12 with the encoder 28 preferably positioned near the motor 22. A position sensor 30 is positioned on the frame 12 and is facing the engine block 78. The position sensor 30 is preferably a laser spotter but may also be an ultrasonic sensor or other well known sensing device.

The piston insertion machine 10 also includes a joystick 32 or other control mechanism. The joystick 32 is preferably located on the frame 12. A drive wheel 34 is located on the frame 12 which is in communication with the motor 22 via a drive belt 36 and a pulley 38 mechanism.

Still referring to FIG. 1, the piston insertion machine 10 also includes an interlock system 40. The interlock system 40 is preferably an electrical interlock system 40 associated with the controller 26. The interlock system 40 may also be a mechanical locking system located near the wheels 18 or the motor 22 (the location of the interlock system 40 is not critical to the understanding of the present invention).

The piston insertion machine 10 further includes a base 42 partially surrounded by a shroud 44. The base 42 stores piston assemblies 46 thereon, and is preferably designed to hold a minimum of one engine of piston assemblies 46 (e.g., eight, ten, twelve, etc. piston assemblies). However, the base 42 may store more or less than one engine of piston assemblies 46 depending on the needs of the operator. A guard 48 is provided on the frame 12 of the piston insertion machine 10 (see also FIG. 3).

Figure 2:
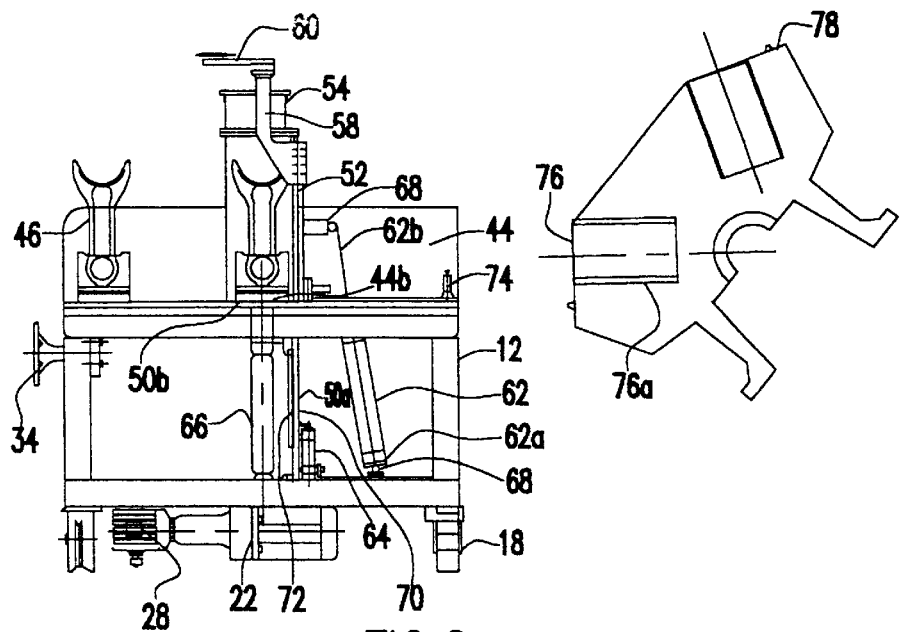
FIG. 2 shows a diagrammatic side plan view of the piston insertion machine having a piston assembly located within a barrel assembly of the present invention.

FIG. 1 further shows a barrel assembly 50 located on the base 42. In FIG. 1, the barrel assembly 50 is in a upright position, substantially in alignment with the piston assemblies 46. The barrel assembly 50 includes doors 52 and a piston ring compressor 54 at a distal end. (FIG. 2 shows additional features of the barrel assembly 50.) The doors 52 can be positioned in either an opened or closed position, depending on the particular stage of operation.

The barrel assembly 50 is positionable via a positioning mechanism (e.g., fluid system) generally depicted as 56. The positioning mechanism 56 may be for example, a hydraulic or other fluid system; however, a "jackscrew" or other electrical or mechanical system is also contemplated for use with the present invention. The positioning mechanism 56 is preferably controlled by a control panel (not shown) located on the base 42 of the piston insertion machine 10, or alternatively may be controlled by the joystick 32.

FIG. 2 shows a diagrammatic side plan view of the piston insertion machine 10 with the barrel assembly 50 in the upright position, and a piston assembly 46 inserted therein. The barrel assembly 50 includes a barrel frame 50a and a base 50b. The barrel frame 50a and the base 50b in addition to the frame 12 support the several components of the positioning mechanism 56 (and the barrel assembly 50). The barrel assembly 50 also includes an outward extending arm 58 connected to a positioning arm 60.

Still referring to FIG. 2, the positioning mechanism 56 includes components 62, 64 and is associated with an inserting mechanism depicted as component 66, each providing a separate movement of either the barrel assembly 50 or the piston assembly 46. The component 62 is pivotally connected to the frame 12 at a first end 62a and the barrel frame 50a at a second end 62b via a swivel connection 68. The component 64 is connected to a first side 70 of the barrel frame 50a, while the component 66 is connected to the base 50b on a second side 72 of the barrel frame 50a. Shock absorbers 74 are located throughout the compartment 16 of the piston insertion machine 10. The shock absorbers 74 may also be provided at other locations on the frame 12.

Figure 3:
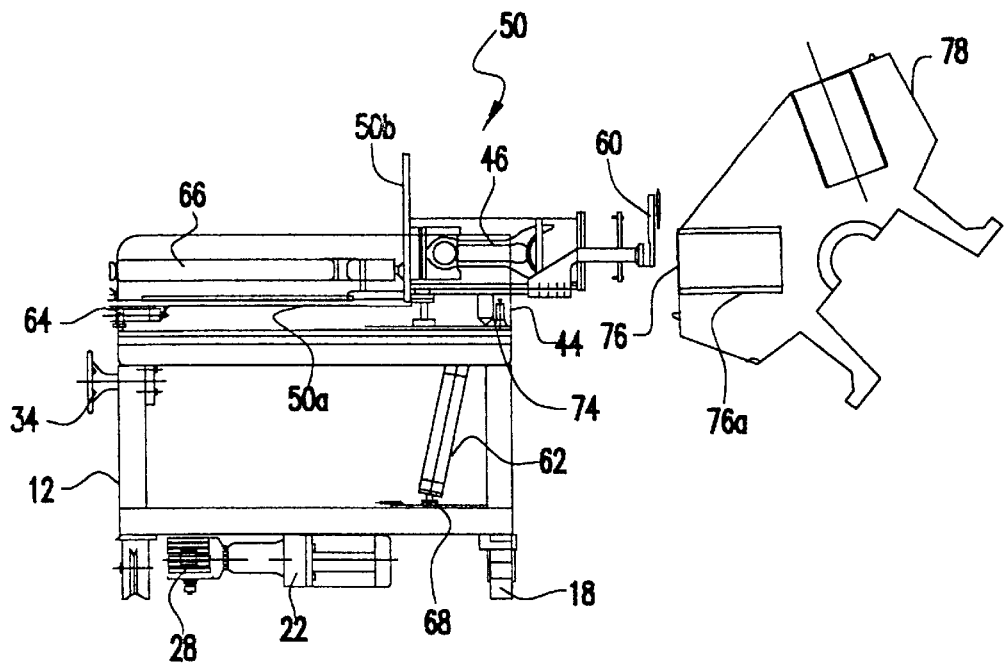
FIG. 3 shows a diagrammatic side plan view of the piston insertion machine 10 when the barrel assembly 50 is in a second or horizontal position.

FIG. 3 shows a diagrammatic side plan view of the piston insertion machine 10 when the barrel assembly 50 is in the horizontal position. In FIG. 3, the component 62 is in a retracted position, and the component 64 and the component 66 are in a horizontal position. The positioning arm 60 is located proximate to the cylinder 76. Also, the component 66 is seen connected to the base 50b on the second side 72 of the barrel frame 50a.

Figure 4:
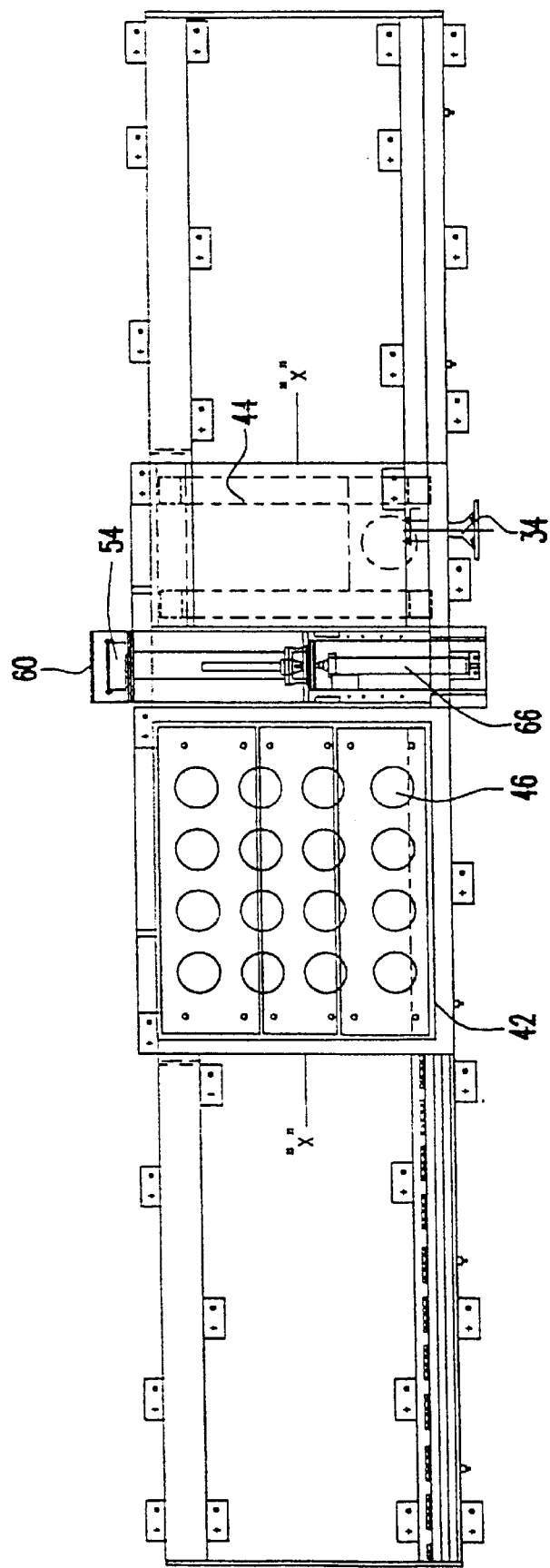
FIG. 4 shows a diagrammatic top plan view of the piston insertion machine when the barrel assembly is in the horizontal position.

FIG. 4 shows a top plan view of the piston insertion machine 10 when the barrel assembly 50 is in the horizontal position. This view is shown to better illustrate the position of the barrel assembly 50 with relation to the base 42 of the piston insertion machine 10 as well as the cylinders 76 of the engine block 78. In particular, the barrel assembly 50 is substantially perpendicular to a length-wise axis "X" of the base 42. As noted in FIG. 4, the components 64 and 66 as well as the barrel frame 50a are also situated in the horizontal position with relation to the base 42.

In the horizontal position as shown in FIG. 4, the barrel assembly 50 is at a substantially same height as the cylinders 76 of the engine block 78. Also, the doors 52 of the barrel assembly 50 are in the closed position and a single piston assembly 46 is located within the barrel assembly 50. At the horizontal position, the cylinders 76 of the engine block are aligned with the barrel assembly 50. FIG. 4 further shows the positioning arm 60 which is preferably U-shaped with a diameter larger than the barrel assembly 50 or the piston assembly 46.

Figure 5:
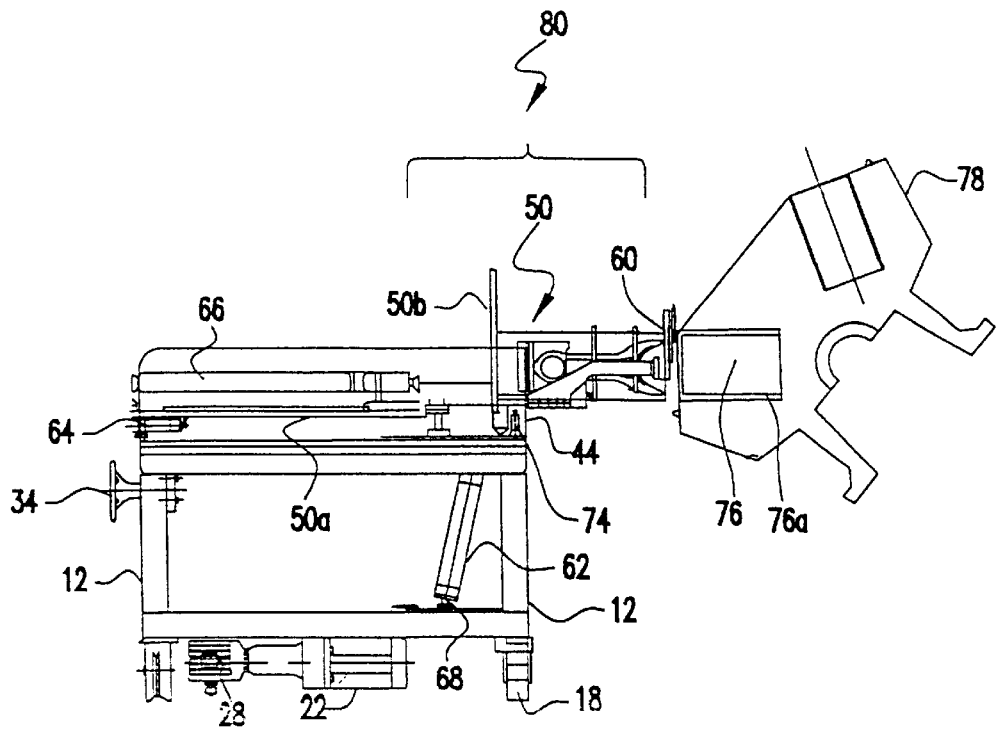
FIG. 5 shows a diagrammatic side plan view of the piston insertion machine when the barrel assembly is in an extended horizontal position.

FIG. 5 shows a diagrammatic side plan view of the piston insertion machine 10 when the barrel assembly 50 is in an extended horizontal position 80. In this position, the positioning arm 60 is in contact with the engine block 78 or a cylinder liner 76a.

Figure 6:
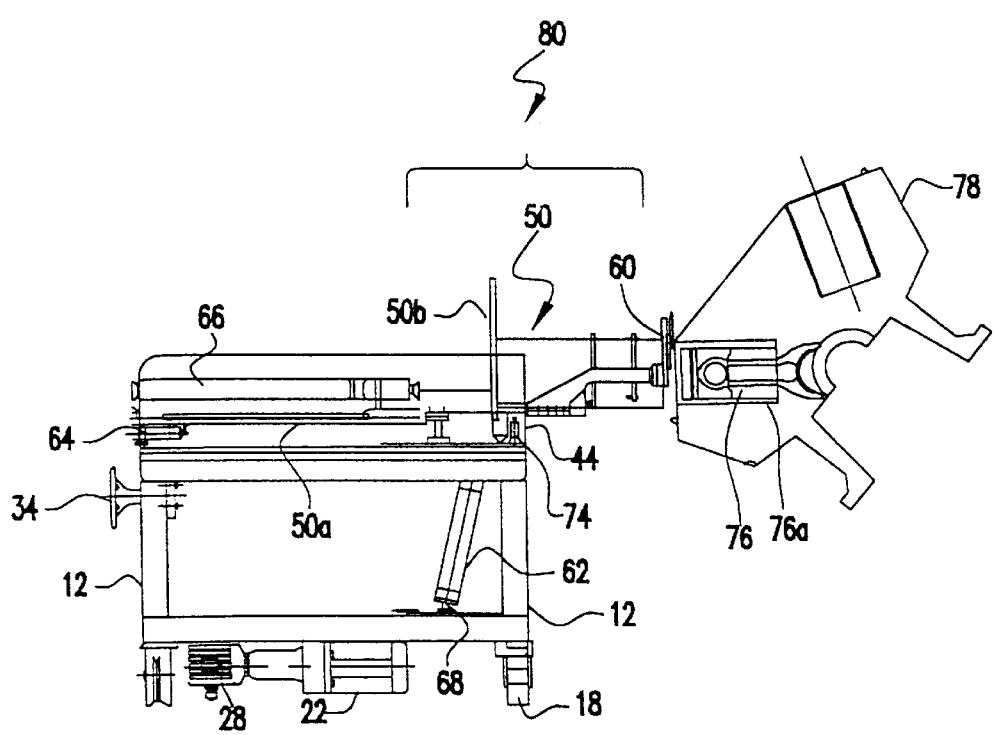
FIG. 6 shows a diagrammatic side plan view of the piston insertion machine when the barrel assembly is in the extended horizontal position and the piston assembly is inserted into a cylinder.

FIG. 6 shows a diagrammatic side plan view of the piston insertion machine 10 when the piston assembly 46 is inserted into the cylinder 76. The component 66 is extended in this figure, and the piston assembly 46 is in the cylinder 76. FIG. 6 further shows the positioning arm 60 in contact with the cylinder 76 or cylinder liner 76a of the engine block 78.

Industrial Applicability

In operation, the piston insertion machine 10 allows an operator to position, align and insert the piston assembly 46 into the cylinder 76 of the engine block 78. First, an initial position on the engine block 78 is located by the position sensor 30. The initial position is preferably a head bolt hole of the engine block 78; however, any constant engine block 78 feature may also be used as the initial position.

The controller 26 then sets the initial position 10 (e.g., "zero" or reference position) as a reference position so that the piston insertion machine 10 may be accurately moved between the cylinders 76 of the engine block 78. The controller 26 may be pre-programmed with the configuration of several engine blocks so that the piston insertion machine 10 may be positioned to any cylinder 76 on the engine block 78, regardless of the specific configuration or design of the engine block 78.

Once the initial position is set, the encoder 28 is now capable of automatically positioning the piston insertion machine 10 to any location on the engine block 78 with reference to the initial position. The combination of the controller 26 and encoder 28 thus permit the piston insertion machine 10 to move precisely between adjacent or non adjacent cylinders 76, depending on the particular programming of the controller 26.

The piston insertion machine 10 is locked into place by the interlock system 40 during the setting of the initial position or after the piston insertion machine 10 has been moved to a desired position for insertion of the piston assembly 46 into the cylinder 76. After the initial position is set or the piston assembly 46 is inserted into the cylinder 76, the interlock system 40 disengages so that the piston insertion machine 10 can move to the next cylinder.

The piston insertion machine 10 is capable of moving between the desired positions via the wheels 18. The wheels 18 are driven via the motor 22 and the rack and pinion gear 24, or alternatively manually driven by the drive wheel 34. The manual system may also be used in conjunction with the encoder 28 and position sensor 30 to provide fine adjustments in the positioning of the piston insertion machine 10 prior to inserting the piston assemblies 46 into the respective cylinders 76.

In order to insert the piston assembly 46 into the respective cylinder 76 of the engine block 78, a single piston assembly 46 is inserted into the barrel assembly 50. In this operational stage, the barrel assembly 50 is in the upright position and is in substantial alignment with the piston assemblies 46 on the base 42 of the frame 12. Once the piston assembly 46 is inserted within the barrel assembly 50, the doors 52 are closed so that the barrel assembly 50 can be rotated to the horizontal position via the component 62. The component 64 and the component 66 are also moved to the horizontal position at this operational stage.

In the horizontal position, the barrel assembly 50 is at a substantially same height as the cylinders 76 of the engine block 78, and the doors 52 remain closed to ensure that the piston assembly 46 remains within the barrel assembly 50. Once in the horizontal position, the piston assembly 46 is slid through the piston ring compressor 54 into the cylinder 76 by the extension of the component 66. The shock absorbers 74 are used to stabilize the piston insertion machine 10 throughout the several movements of the barrel assembly 50.

The barrel assembly 50 is preferably locked into place during the alignment and insertion of the piston assembly 46 into the cylinder 76. This ensures that that the piston assembly 46 remains aligned and thereafter properly inserted within the cylinder 76. Once the piston assembly 46 is inserted into the cylinder 76, the barrel assembly 50 is unlocked and retracted so that additional piston assemblies 46 can be inserted therein.

Other aspects, objects and advantages of this invention can be obtained from a study of the drawings, the disclosure and the appended claims.

What is claimed is:

1. A piston insertion machine for inserting a piston assembly into a cylinder of an engine block, the piston insertion machine comprising:

a barrel assembly adapted to house the piston assembly therein;

a positioning mechanism attached to the barrel assembly, the positioning mechanism adapted to pivot the barrel assembly between an upright position and a horizontal position; and an inserting mechanism adapted to communicate with the barrel assembly, the inserting mechanism adapted to insert the piston assembly into the cylinder;

a controller adapted to set an initial position of the barrel assembly relative to a first position of the engine block; and an interlock system adapted to lock a position of the piston insertion machine when the controller sets the initial position, the interlock system adapted to disengage the lock after the controller sets the initial position.

2. A piston insertion machine for inserting a piston assembly into a cylinder of an engine block, the piston insertion machine comprising:

a barrel assembly adapted to house the piston assembly therein;

a positioning mechanism attached to the barrel assembly, the positioning mechanism adapted to pivot the barrel assembly between an upright position and a horizontal position; and an inserting mechanism adapted to communicate with the barrel assembly, the inserting mechanism adapted to insert the piston assembly into the cylinder;

a frame, the barrel assembly connected to the frame;

at least one wheel connected to the frame; and a motor adapted to drive the at least one wheel and move the frame.

3. The piston insertion machine of claim 2, including:

a manual positioning mechanism, the manual positioning mechanism having a drive wheel, a pulley, and a drive belt positioned between the drive wheel and the pulley, the pulley coupled to the motor.

4. The piston insertion machine of claim 2, including a shroud positioned on the frame.

5. A piston insertion machine for inserting a piston assembly into a cylinder of an engine block, the piston insertion machine comprising:

a barrel assembly adapted to house the piston assembly therein;

a positioning mechanism attached to the barrel assembly, the positioning mechanism adapted to pivot the barrel assembly between an upright position and a horizontal position; and an inserting mechanism adapted to communicate with the barrel assembly, the inserting mechanism adapted to insert the piston assembly into the cylinder; and a piston ring compressor connected to the barrel assembly; and at least one door posititonable between an opened and a closed position and located proximate the piston ring compressor.

6. The piston insertion machine of claim 5, including:
an outward extending arm extending beyond the piston ring compressor.

7. The piston insertion machine of claim 5, including:
at least one shock absorber associated with the barrel assembly.

8. The piston insertion machine of claim 5, including a guard proximate the barrel assembly.

9. A piston insertion machine adapted to insert a piston assembly within a cylinder of an engine block, comprising:
- a barrel assembly adapted to house the piston assembly therein;
- a first component for rotating the barrel assembly between a first position and a second position;
- a second component for moving the barrel assembly into an extended position toward the engine block when the barrel assembly is in the second position; and
- a third component for moving the piston assembly from within the barrel assembly into the cylinder;
- a cart for housing the first, second and third components; and
- a controller positioned on the cart, the controller adapted to set a first location of the cart with respect to the engine block.

10. The piston insertion machine of claim 9, including an interlock system adapted to lock a position of the piston insertion machine when the controller sets the first location, the interlock system adapted to release the lock after the controller sets the first location.

11. The piston insertion machine of claim 9, including:
a manual positioning mechanism, the manual positioning mechanism having a drive wheel, a pulley, and a drive belt positioned between the drive wheel and the pulley, the pulley coupled to the motor.

* * * * *